May 18, 1937.  J. R. ROSS  2,080,788

APPARATUS FOR COLONIC IRRIGATION

Filed July 28, 1934

INVENTOR
Joseph Ruggles Ross

Patented May 18, 1937

2,080,788

UNITED STATES PATENT OFFICE 2,080,788

APPARATUS FOR COLONIC IRRIGATION

Joseph Ruggles Ross, New York, N. Y.

Application July 28, 1934, Serial No. 737,393

3 Claims. (Cl. 128—227)

This invention relates to apparatus for colonic irrigation without the aid of an attendant.

The usual apparatus for colonic irrigation consists of a table on which the patient lies, above which are supported one or more fluid containers of a capacity of several gallons each, placed at an elevation of several feet, with tubes leading from these containers through a valve for controlling or stopping the flow of the liquid to a rectal tube 36 to 40 inches long, of considerable diameter, and means to reverse the flow after injection. The discharge is usually connected directly or indirectly to a sewer.

This apparatus is expensive, too large for household use, and requires a skillful attendant to control the valve operation and to advance the colonic tube during the irrigation. In operation a certain amount of fluid is allowed to flow into the colon, the valve controlling the flow is closed, and a valve controlling the discharge through the colonic tube is opened to permit discharge. The valve controlling the inflow remains closed during discharge, and the discharge valve remains closed during inflow, and the irrigation is therefore by alternate operations. The discharge takes place through the tube and not around it.

I have found that an equally effective result may be obtained by the use of a short rectal tube instead of the long colonic tube if the tube can be retained in place while a sufficient amount of liquid is injected and discharged to wash out the upper part of the colon. In this construction the discharge will take place around and not through the rectal tube. This discharge and injection may be either continuous or alternate.

These objects are best attained by providing means for holding a short rectal tube of comparatively small diameter in place during the irrigation, preferably by attaching the apparatus of which the rectal tube is an integral part to the body of the user.

The object of my invention is to provide an apparatus for self colonic irrigation, simple in construction, and of moderate cost.

A further object is to provide an apparatus for self irrigation which in operation will not permit a pressure which might be injurious to the user.

With the foregoing and other objects in view my invention is embodied in the improved irrigation apparatus illustrated in the accompanying drawing and hereinafter described and claimed and in such variations and modifications thereof as will be obvious to those skilled in the art to which my invention relates.

Referring to the drawing, Fig. 1 is a view in perspective of the apparatus showing a source of liquid supply and its connection through one member of the base to the rectal tube.

Figure 2:
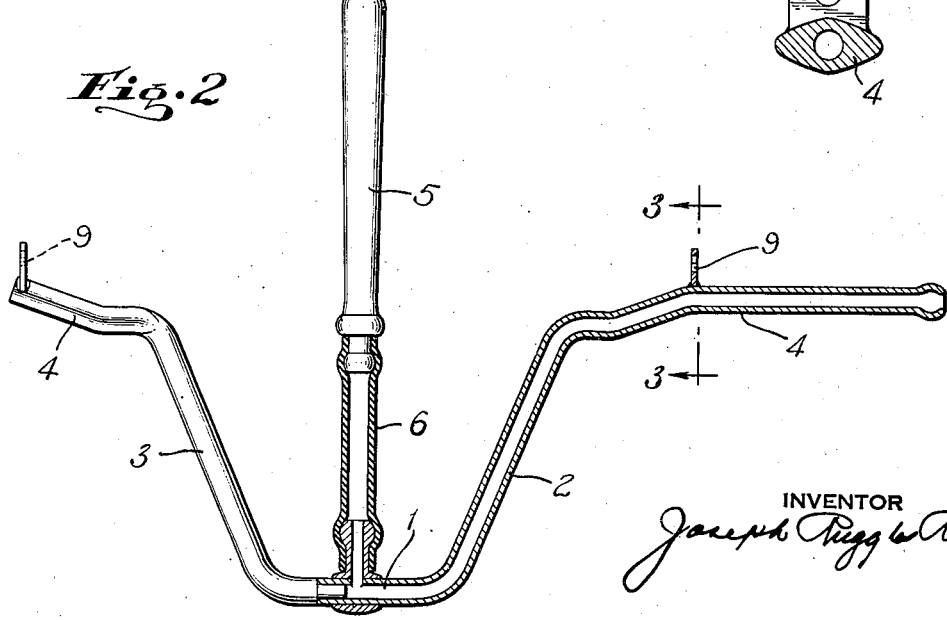
Fig. 2 is an elevational view partly in section of a portion of my improved device.

Referring to Fig. 2, there is shown a base 1 with a relatively stiff member 2 directed towards the front of the body tubular in form, the channel carrying the liquid supply from its terminus to the rectal tube 5, a member 3 similar to member 2 but solid in construction and extending to the rear of the body. Mounted on the base 1 is the rectal tube 5 with an intermediate flexible connection 6. The portions 4, 4 of the members 2 and 3 are broadened to an oval form for that portion intended to rest in the crotch of the body. At each of the termini of the members 2 and 3 is mounted a button 9, 9.

Figure 1:
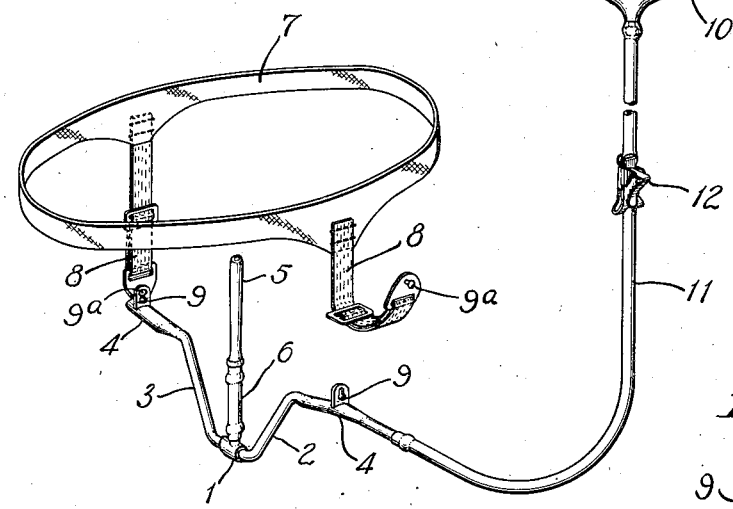
Figure 3:
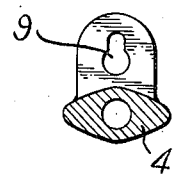
Fig. 3 is a sectional view on the line 3—3 of Fig. 2 looking in the direction of the arrows.

Fig. 1 shows a belt 7 suitable to be strapped around the waist with depending tabs 8, 8, respectively, on the front and rear, said tabs at their lower extremity carrying loops 9a, 9a for connecting the belt 7 to the base 1 by attachment to the buttons 9, 9. A source of liquid supply 10 is connected by a tube 11 to the member 4 of the base 1. A snap 12 may be used to open or close the channel in tube 11.

In operation the belt 7 is strapped around the waist, the rectal tube 6 is inserted, and the attachment of the base to the belt is made by attaching the tabs 8, 8 to the buttons 9, 9. The tube leading from the liquid container 10 is attached to the forward end of the member 2. Sitting on the toilet, the user opens the clip of valve 12 and permits the liquid to flow into the colon. Peristaltic pressure will cause a discharge around the rectal tube. During this discharge the clip or valve 12 may be either open or closed. The operation is then repeated without the user rising and can be continued until the colon is washed completely to the caecum. No attendant is required and no injury can result from excessive pressure.

Everything excepting the belt is of either rubber or metal and thoroughly sanitary.

It is obvious that by a slight variation in the form of the base and the substitution of a vaginal tube, the apparatus may be used for vaginal lavage.

Having thus described my invention what I claim is:

1. An apparatus for colonic irrigation, comprising a rigid elongated member having a closed portion and a channelled portion with an intermediate partly channelled portion which is fitted to the crotch of the user, a rectal tube flexibly connected to the channelled part of the crotch portion, a belt adapted to be adjusted to the torso of the user, and flexible, adjustable straps for detachably connecting the ends of said elongated member to the fore and rear portions of said belt.

2. An apparatus of the class described, comprising a rectal tube, an elongated support flexibly connected with the rectal tube and having a forward and rearward extension, one of which is closed and the other channelled and adapted to connect the rectal tube with a supply of irrigating liquid, said support having an intermediate portion which is fitted to the crotch of the user and from which the rectal tube extends in an upward direction, said rectal tube flexibly supported by a tubular member attached to said rectal tube, a belt adapted to be fitted to the waist of the torso of the user, and flexible adjustable straps for detachably connecting the fore and rear parts of the belt to the forward and rearward extensions of said support whereby said support is wholly supported by and suspended from said belt.

3. An apparatus of the class described comprising a rectal tube, an elongated relatively stiff member flexibly connected with the rectal tube and having a forward and rearward extension, said relatively stiff member being connected with said rectal tube by a flexible, hollow conduit, one of said extensions and one part of said elongated member being closed to a point adjacent the point where the rectal tube is connected with said elongated member, the other part of said elongated member and the other extension being channelled, these parts being adapted to connect the rectal tube with a supply of irrigating liquid, said elongated member having an intermediate portion which is fitted to the crotch of the user and from which the rectal tube extends in an upward direction, a support adapted to rest upon a part of the torso of the user and flexible straps depending from the front and rear portions of said support and connected with the forward and rearward extensions of elongated member whereby the latter is wholly suspended from said support.

JOSEPH RUGGLES ROSS.